(12) United States Patent
Patrick

(10) Patent No.: US 9,020,539 B2
(45) Date of Patent: Apr. 28, 2015

(54) METHOD AND APPARATUS FOR CALCULATING A POSITION ESTIMATE OF A MOBILE STATION USING NETWORK INFORMATION

(75) Inventor: Christopher Patrick, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 10/580,622

(22) PCT Filed: Nov. 24, 2004

(86) PCT No.: PCT/US2004/039692
§ 371 (c)(1),
(2), (4) Date: May 24, 2006

(87) PCT Pub. No.: WO2005/055494
PCT Pub. Date: Jun. 16, 2005

(65) Prior Publication Data
US 2007/0135134 A1    Jun. 14, 2007

Related U.S. Application Data

(60) Provisional application No. 60/525,594, filed on Nov. 26, 2003.

(51) Int. Cl.
*H04W 24/00* (2009.01)
*H04W 64/00* (2009.01)
*G01S 5/02* (2010.01)
(Continued)

(52) U.S. Cl.
CPC ............. *H04W 64/00* (2013.01); *G01S 5/0263* (2013.01); *G01S 19/09* (2013.01); *G01S 19/46* (2013.01); *H04W 4/20* (2013.01); *H04W 64/006* (2013.01)

(58) Field of Classification Search
USPC .......................... 455/456.1–457, 404.1–404.2
See application file for complete search history.

(56) References Cited

U.S. PATENT DOCUMENTS 5,734,977 A * 3/1998 Sanmugam .................... 455/410
6,038,444 A * 3/2000 Schipper et al. ............... 455/421
(Continued)

FOREIGN PATENT DOCUMENTS

EP       1304897 A1   4/2003
GB       2364617      1/2002
(Continued)

OTHER PUBLICATIONS

Caffrey, James J, Jr. et al.: "Overview of Radiolocation in CDMA Cellular Systems," IEEE Communications Magazine, IEEE Service Center, Piscataway, N.J. US (Apr. 1, 1998), 36(4), pp. 38-45.
(Continued)

*Primary Examiner* — Sharad Rampuria
(74) *Attorney, Agent, or Firm* — Thien T. Nguyen

(57) ABSTRACT

A method for calculating a position estimate of a mobile station (MS) includes collecting in the MS position estimate information (PEI) transmitted by a location node. At some point, the MS generates PEI parameters which include information from which the location node can be located or identified. The MS generates the PEI parameters based upon the PEI transmitted by the location node. Once generated, the MS sends the PEI parameters to a position determination entity. The PEI parameters permit calculation of the position estimate of the mobile station.

60 Claims, 5 Drawing Sheets

(51) Int. Cl.
  *G01S 19/09* (2010.01)
  *G01S 19/46* (2010.01)
  *H04W 4/20* (2009.01)

(56) References Cited

U.S. PATENT DOCUMENTS

| | | | |
|---|---|---|---|
| 6,166,685 A * | 12/2000 | Soliman | 342/357.1 |
| 6,198,935 B1 * | 3/2001 | Saha et al. | 455/456.2 |
| 6,236,365 B1 * | 5/2001 | LeBlanc et al. | 342/457 |
| 6,330,454 B1 * | 12/2001 | Verdonk | 455/456.2 |
| 6,480,529 B1 * | 11/2002 | Sih et al. | 375/152 |
| 6,847,892 B2 * | 1/2005 | Zhou et al. | 701/408 |
| 6,903,684 B1 | 6/2005 | Simic et al. | 342/357.15 |
| 6,928,275 B1 * | 8/2005 | Patrick et al. | 455/256 |
| 6,961,367 B2 * | 11/2005 | Simic et al. | 375/214 |
| 6,964,012 B1 * | 11/2005 | Zirngibl et al. | 715/201 |
| 7,016,688 B2 * | 3/2006 | Simic et al. | 455/456.1 |
| 7,369,599 B2 * | 5/2008 | Patrick | 375/141 |
| 2002/0115448 A1 * | 8/2002 | Amerga et al. | 455/456 |
| 2003/0008669 A1 * | 1/2003 | Stein et al. | 455/456 |
| 2003/0012257 A1 * | 1/2003 | Challa et al. | 375/130 |
| 2003/0050077 A1 * | 3/2003 | Takeuchi et al. | 455/456 |
| 2003/0125046 A1 * | 7/2003 | Riley et al. | 455/456 |
| 2003/0134646 A1 * | 7/2003 | Forrester | 455/456 |
| 2003/0186702 A1 * | 10/2003 | McConnell et al. | 455/450 |
| 2003/0193992 A1 * | 10/2003 | Challa et al. | 375/147 |
| 2004/0160365 A1 * | 8/2004 | Riley et al. | 342/451 |
| 2004/0162085 A1 * | 8/2004 | Han | 455/456.1 |
| 2004/0165657 A1 * | 8/2004 | Simic et al. | 375/211 |
| 2004/0166873 A1 * | 8/2004 | Simic et al. | 455/456.1 |
| 2004/0198449 A1 * | 10/2004 | Forrester et al. | 455/561 |
| 2004/0203864 A1 * | 10/2004 | DiBuduo | 455/456.1 |
| 2005/0064877 A1 * | 3/2005 | Gum et al. | 455/456.1 |
| 2007/0263563 A1 | 11/2007 | Biagioni et al. | |
| 2012/0178450 A1 * | 7/2012 | Kuru et al. | 455/436 |

FOREIGN PATENT DOCUMENTS

| | | |
|---|---|---|
| JP | 2003509661 T2 | 3/2003 |
| JP | 2003319434 | 11/2003 |
| TW | 494248 B | 7/2002 |
| TW | 533320 | 5/2003 |
| WO | WO0059257 A1 | 10/2000 |
| WO | WO0119112 | 3/2001 |

OTHER PUBLICATIONS

Supplementary European Search Report—EP04812252—Search Authority—Berlin—Aug. 12, 2011.
Taiwanese Search report—093136539—TIPO—Oct. 7, 2010.
International Search Report and Written Opinion—PCT/US2004/039692, International Searching Authority/US, Jul. 13, 2005.

* cited by examiner

US 9,020,539 B2

METHOD AND APPARATUS FOR CALCULATING A POSITION ESTIMATE OF A MOBILE STATION USING NETWORK INFORMATION

RELATED APPLICATION

This application claims priority to U.S. Provisional Application No. 60/525,594, filed on Nov. 26, 2003.

BACKGROUND

1. Field of the Invention

The present invention relates generally to the field of mobile communications, and more specifically to estimating the position of a mobile station using network information.

2. Relevant Background

Wireless devices, such as mobile stations (MSs) or terminals, are widely used for various purposes. One key use of wireless devices is for communication with a wireless communication network for voice, packet data, and the like. Another emerging use of these wireless devices is for position determination, which may be desirable or necessary in certain circumstances. For example, the Federal Communications Commission (FCC) has adopted a report and order for an enhanced 911 (E-911) wireless service that requires the location of a wireless device (for example, a cellular phone) to be provided to a Public Safety Answering Point (PSAP) each time a 9-1-1 call is made from the device. The FCC mandate requires the location of the wireless device to be accurate to within 50 meters for 67% of calls and within 150 meters for 95% of calls.

In addition to the FCC mandate, service providers have begun to recognize that location services (that is, services that identify the position of a wireless device) may be used in various applications to provide value-added features that may generate additional revenue for the service providers. For example, a service provider may use location services to implement location-sensitive billing such that different rates may be charged for calls originating from different zones. A service provider may also use location services to provide location-sensitive information such as driving directions, local information on traffic, gas stations, restaurants, hotels, and the like. Other applications that may be provided using location services include asset tracking services, asset monitoring and recovery services, fleet and resource management, personal-location services, gaming, and personal security, among others.

Wireless communication networks are in the process of offering increasingly sophisticated capabilities for determining the position of a wireless device within the network. In a code division multiple access (CDMA) digital cellular network, for example, the position determination capability can be provided by advanced forward link trilateration (AFLT), a technique that computes the location of the wireless device from the measured time of arrival of radio signals transmitted from earth bound base stations. A more advanced technique is hybrid position determination, where the wireless device employs a Global Positioning System (GPS) receiver and the position is computed based on both AFLT and GPS measurements.

There are a number of known message protocols and formats for CDMA position determination employing AFLT, GPS, and hybrid receivers. Existing position determination technologies have achieved considerable success by providing location measurements rapidly and with precision.

SUMMARY

A method for calculating an estimate of the position of a mobile station (MS) (hereafter, simply referred to as a "position estimate") that includes collecting in the MS, position estimate information (PEI) transmitted by a location node is disclosed in the following description. The MS generates PEI parameters containing information from which the location node can be located and/or identified. The MS generates the PEI parameters based upon the PEI transmitted by the location node. Once the PEI parameters are generated, the MS sends the PEI parameters to a position determination entity. The PEI parameters permit calculation of the position estimate.

In accordance with other embodiments, a system for calculating a position estimate includes a location node and a position determination entity. The location node transmits the PEI to the mobile station. The mobile station generates PEI parameters that contain information from which the location node can be located or identified. The MS generates the PEI parameters based upon the PEI transmitted by the location node. The position determination entity receives the PEI parameters sent by the mobile station. A processor associated with the position determination entity calculates the position estimate based upon the PEI parameters.

DETAILED DESCRIPTION

In the following detailed description, reference is made to the accompanying drawing figures which form a part of this description, and which show various embodiments by way of illustration. It is to be understood that other embodiments may be utilized, and structural, electrical, as well as procedural changes may be made without departing from the scope of the claimed invention.

Figure 1:
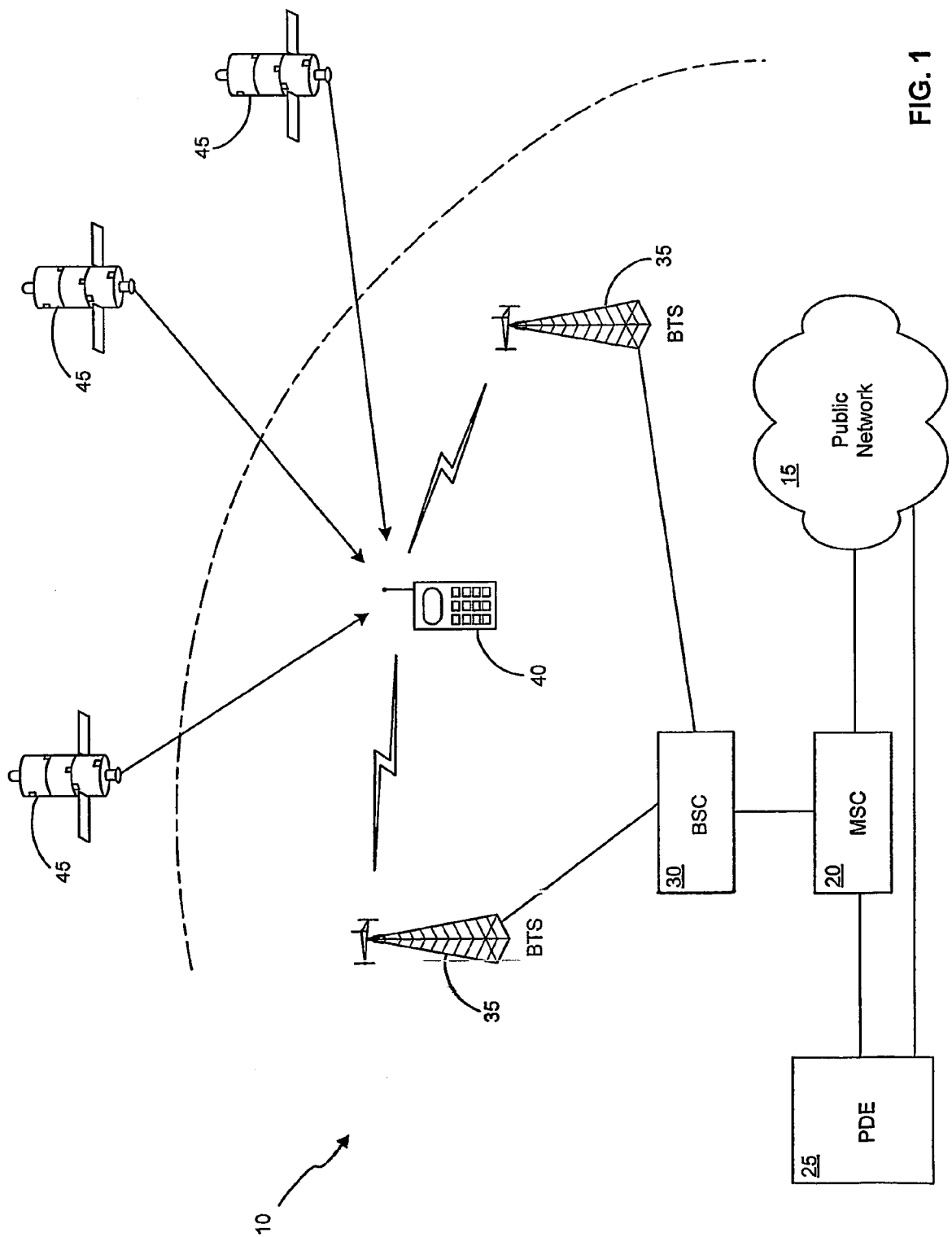
FIG. 1 is a diagram of a hybrid position determination system having a number of position determination subsystems.

FIG. 1 is a diagram of a hybrid position determination system 10 which includes a number of position determination subsystems. One such position determination subsystem is a Satellite Positioning System (SPS). Examples of possible SPSs which may be used in system 10 include the U.S. Global Positioning System (GPS), the Russian Glonass system, and the European Galileo system. Reference will be made to various types of satellite systems, but it is to be appreciated that the teachings are equally applicable to positioning systems that utilize pseudolites or a combination of satellites, pseudolites and/or other transmitters and/or receivers.

For instance, pseudolites are ground-based transmitters that broadcast a pseudo-random noise (PN) code (similar to a GPS signal) modulated on an L-band (or other frequency) carrier signal, generally synchronized with GPS time. Each such transmitter may be assigned a unique PN code which permits identification by a remote receiver. Pseudolites are useful in situations in which GPS signals from an orbiting satellite might be unavailable, such as tunnels, mines, buildings, urban canyons, or other enclosed areas. Accordingly, the term "GPS" will be used herein to include the identified alternative SPSs, including systems that use pseudolites. Likewise, the term "GPS signal" includes signals from these alternative positioning systems and signals from pseudolites. Another possible position determination subsystem that may be implemented in system 10 is a wireless communication system (sometimes referred to as a network). One example of such a subsystem is a code division multiple access (CDMA) communication system. Such a CDMA system may be designed to implement one or more standards including, for example, cdma2000, IS-856, IS-95, W-CDMA, and the like.

The term "location node" will be used herein to refer to any entity that transmits signals from which location related information can be determined. Particular examples of location nodes include satellites of the various SPSs, base stations of a CDMA wireless communication system, as well as the transmitting entities of other system including global system for mobile communications (GSM), Bluetooth, WI-FI (for example, a wireless access point), radio frequency identification (RFID), digital television, or any other system that can transmit signals from which information that can be used to determine the location of the transmitting location node.

Accordingly, while the specific embodiment depicted in FIG. 1 shows the hybrid position determination system 10 being implemented using a GPS and CDMA communication system, other types and combinations of position determination subsystems, and other types of location nodes, may alternatively be used based upon the teachings provided in this description. Moreover, some embodiments do not require position determination using a GPS position determination subsystem. Such embodiments would therefore not require the GPS satellites 45 and supporting components.

Referring still to FIG. 1, system 10 is shown having a public network 15, a mobile switching center (MSC) 20, and a position determining entity PDE) 25. The MSC is in communication with at least one base station controller (BSC) 30, which is shown in contact with two base stations (BSs) 35. For the purpose of this description, no distinction is made between the components and functions of a base station and those of a base station transceiver. Each BS provides wireless communication to one or more mobile stations (MSs) 40. The MS 40 is shown receiving signals from the BSs 35 and from multiple GPS satellites 45. For convenience, the position determination system 10 is shown having two BSs 35 and one MS 40. However, it is to be understood that there may be a number of BSs 35, each providing communication to a plurality of MSs 40.

The public network 15 may be a public switch telephone network (PSTN), integrated services digital network (ISDN), public land mobile network (PLMN), circuit switched public data network (CSPDN), packet switched public data network (PSPDN), or any other such network. The PDE 25 is shown in communication with both the MSC and the public network 15, but this is not a requirement. The PDE may alternatively be connected with only one of these components such that the PDE is in communication with either the MSC or the public network.

The MSC 20 coordinates all communication channels and processes, and provides access for the MS to networks, such as the public network 15. The BSC 30 manages telecommunication functions associated with the BSs 35. The BSC may provide power control, call resource allocation, and mobility management functionality including, when necessary, the orchestration of handoffs between the BSs 35.

The MS 40 may be any device capable of receiving and processing signals from the position determination subsystems to obtain timing, ranging, location information, position estimate information (PEI), and any combination thereof. Particular examples of devices which may be implemented for the MS include a cellular telephone, a wireless device, an access terminal, a mobile device, a computer terminal, a personal digital assistant (PDA), and a mobile navigation system, among others.

The terms "position estimate information" or "PEI" denote information transmitted by one or more location nodes, such as BSs 35, and which can be used to locate and/or identify the transmitting location node. PEI may be transmitted from a plurality of location nodes of the same type, such as CDMA BSs. Alternatively, the location nodes may be of different types, for instance, one location node might be a BS 35 transmitting PEI, while another location node might be a wireless access point of a WI-FI network. In another example separate PEI is transmitted from a BS 35, a wireless access point of a WI-FI network, and a GPS satellite 45.

Location nodes at different locations will typically transmit different PEI. A location node may be configured to broadcast the PEI to any mobile station present within the communication range of the location node, or the location node may alternatively transmit the PEI to particular mobile stations in a point-to-point communication. This point-to-point communication may be initiated by a request sent by the MS 40, or it may be initiated by the transmitting location node.

The transmission of various types of PEI will now be described with respect to messaging standards defined in Telecommunications Industry Association/Electronics Industry Association (TIA/EIA) standard IS-2000 and IS-856. However, it is to be understood that the position determination system 10 does not require any particular standard or protocol for communicating the PEI to a mobile station, such as MS 40. In addition, the PEI does not need to include any particular type or amount of information relating to the location or identification of the transmitting BS.

In accordance with IS-2000 or IS-856, messages containing the PEI may be sent on common channels (i.e., channels used for all mobile stations) as well as on dedicated channels (i.e., channels assigned to specific mobile stations). The PEI messages transmitted by the BS 35 may be designed to complement the full IS-2000 protocol, or the full IS-856 protocol. Alternatively, the PEI includes a subset of these possible information types. Table 1 provides an example of the various types of information that may be transmitted by the BS 35 as PEI.

TABLE 1

| Field | Description |
| --- | --- |
| MODE_IND | Indicates the operating mode of the pilot that the MS uses to derive its time reference. |
| SID | System identification. |

TABLE 1-continued

| Field | Description |
| --- | --- |
| NID | Network identification. |
| BASE_ID | Base station identification. |
| SECTOR_ID | Sector address identifier corresponding to the IS-856 pilot used by the MS as its time reference. |
| PILOT_ID_AGE | Pilot identification age, which is the time elapsed between the determination of the pilot identification parameters and the transmission of this element. |
| BASE_ID_PN | PN sequence offset of the pilot corresponding to the BASE_ID. |
| BASE_ID_BAND_CLASS | Band class corresponding to BASE_ID. |
| BASE_ID_CDMA_FREQ | Frequency assignment corresponding to BASE_ID. |
| NUM_ACTIVE_SET_PN | Number of Active Set pilots. |
| ACTIVE_SET_PN | Pilot PN sequence offset (for each member identified in the NUM_ACTIVE_SET_PN). |
| NUM_NGHBR_PN | Number of neighbor pilot PN sequences. |
| NGHBR_PN | Pilot PN sequence offset (for each member identified in the NUM_NGHBR_PN). |
| BASE_LAT | Base station latitude. |
| BASE_LONG | Base station longitude. |

The MS 40 may be designed to receive or otherwise collect the PEI transmitted by one or more location nodes, such as BSs 35. Since the BSs transmit this information on a periodic basis, the MS typically collects and updates the received information on an ongoing basis. At some point, an estimate of the position of the MS 40 (hereafter, simply referred to as a "position estimate") will typically be calculated. The decision which triggers the need for this calculation may arise from, for example, communications received from the PDE 25, an application executing at the MS, the passage of some elapsed time, the MS determining that the accuracy of its position knowledge is beyond some threshold or a communication from some other entity. Specifics regarding various types of such triggers will be described in more detail in conjunction with figures referenced below.

The MS will assemble or otherwise generate a message for communicating to a position determination entity, such as the PDE 25. Upon receipt of the message from the MS, the position determination entity may calculate a position estimate using information contained within the message. The information that the MS 40 generates for the purpose of calculating the position estimate is referred to as "PEI parameters." The PEI parameters include any information that permits the calculation of a position estimate. No specific degree of accuracy is required for the calculated position estimate. For example, the area covered by the position estimate may be quite large, such that the position estimate can only identify in which hemisphere, continent, country, state, or city the MS is currently located. On the other hand, position estimates may be more precise, such as those that locate the MS to an area ranging from a few kilometers to a few meters.

In an embodiment of the disclosed method and apparatus, the PEI parameters communicated to the PDE 25 include all of the information contained in the PEI received from a transmitting BS 35. In situations where the MS 40 receives PEI from a plurality of BSs, then the PEI parameters may also include the additional PEI received from the various BSs. An alternative embodiment is one in which the PEI parameters only include a subset of information obtained from the received PEI.

In another embodiment of the disclosed method and apparatus, the MS sends PEI parameters that contain information derived from the PEI (for example, some or all of the information identified in Table 1) and other information known or ascertainable by the MS 40. In yet another embodiment, the MS uses some or all of the various types of information presented in Table 2 to create a message containing the PEI parameters.

TABLE 2

| Field | Description |
| --- | --- |
| SERVING_BASE_ID | Information from which the identity of the base station with which the MS is currently communicating can be determined. |
| PAST_BASE_ID | Information from which the identity of the base station with which the MS was previously communicating can be determined. |
| ACTIVE_SET | Information from which the identity of all base stations with which the MS is currently in communication can be determined. |
| NEIGHBOR_LIST | Information from which the identity of base stations that are in relatively close proximity to the base station identified in the SERVING_BASE_ID can be determined. |
| LAT | Information from which the latitude of the base station identified in the SERVING_BASE_ID can be determined. |
| LONG | Information from which the longitude of the base station identified in the SERVING_BASE_ID can be determined. |
| CACHED_LOCATION | Previously stored location of the MS. |
| TIME_RECEIVED | Time of receipt by the MS of each item of the PEI. |

TABLE 2-continued

| Field | Description |
|---|---|
| IN_VIEW | Whether or not the source of the PEI is still in view or currently in communication with the BS providing the PEI. |
| PROXIMITY | Parameters which convey proximity of the MS relative to the BS (signal strength, round-trip-delay, signal-to-interference ratio, etc.) |
| LAST_CONTACT | Elapsed time since the MS was in contact with the BS providing the PEI. |
| VELOCITY | Velocity of the MS. |
| DIRECTION | Direction of motion of the MS. |
| NETWORK_TYPE | The frequency and type (CDMA, TDMA, WI-FI, Bluetooth, RFID, etc.) of the network. |
| MS_TYPE | Type or classification of the MS (cellular telephone, wireless computer, personal digital assistant (PDA), etc.) |

In one embodiment, the PEI parameters include the SERVING_BASE_ID. In some instances, this information may be sufficient to accurately identify the BS 35 that is currently serving the MS 40. If the BS 35 or location node can be accurately identified, then the location of the BS or location node may be ascertained from a look up table or other such index that matches base stations or location nodes to locations, thus providing a position estimate. That is, the MS can be assumed to be somewhere within the transmission range of the serving BS or location node.

However, situations may arise where the identification of the serving location node cannot readily be ascertained and thus, the location of the MS 40 cannot be accurately estimated. For instance, consider the situation in which a base station is the location node and the SERVING_BASE_ID (one information element of the PEI parameters) is generated based upon the SID/NID/BASE_ID information provided in the PEI transmitted by the BS (Table 1). Since some networks assign the same SID, NID, and BASE_ID to multiple BSs, the location of the MS 40 cannot be accurately estimated since the SID/NID/BASE_ID combination is not unique. To resolve such a problem, the PEI parameters may include additional information, such as one or more additional parameters identified in Table 2. A specific example is to form the PEI parameters using the SERVING_BASE_ID, along with information from which the latitude and longitude of the BS 35 base station may be identified (for example, the LAT and LONG elements of Table 2). This combination of information will permit the position determination entity to calculate a sufficiently accurate position estimate, as will now be described.

Regardless of the content of the PEI parameters formed by the MS 40, a message containing the PEI parameters may be communicated to a PDE. The PDE is typically a network entity or device capable of calculating a position estimate. In embodiments in which the system 10 includes a CDMA network, the PDE may be implemented using the PDE 25.

An alternative embodiment is one in which the system 10 includes a GSM network. In such an embodiment, the PDE may be implemented as a serving mobile location center (SMLC).

Utilizing conventional position estimating techniques, for example, the PDE may then calculate a position estimate utilizing the information contained in the PEI parameters. For example, if the PEI parameters contain information which identifies the location node with which the MS 40 is currently in communication, the PDE may determine the location of the location node by accessing a look-up table or database which contains the location nodes identifiers and associated location of such nodes. Alternatively, if the PEI parameters contain information that directly identifies a location of the location node (for example, the latitude and longitude of the node), then such information may be directly used by the PDE in calculating the position estimate.

It is to be understood that the PEI parameters have been created based upon the PEI transmitted by the BS 35. The position estimate calculated by the PDE is therefore based upon information provided by another network entity, and more specifically, a location node, such as the BS 35.

The position estimate, which in some cases may be imprecise, is information that is quite useful and therefore desired by a number of different network entities and applications. In some situations, the position estimate may be used as the basis for more accurate position determination calculations. Such calculations may be performed by the PDE, the MS, or some other entity.

Using the embodiment depicted in FIG. 1 as an example, a more precise position determination of the MS may be provided based upon the calculated position estimate. This refined position calculation, which is typically more accurate than the position estimate discussed above, may be based on (1) GPS alone; (2) the CDMA communication system alone; or (3) a hybrid scheme utilizing both GPS and the CDMA communication system.

The GPS system includes a constellation of 24 well-spaced satellites that orbit the earth. In FIG. 1, three such GPS satellites 45 are shown. Each of the satellites transmits a signal marked with a repeating PN code of 1,023 chips uniquely identifying the satellite. The 1,023 chips repeat every millisecond. The signal is also modulated with data bits encoded with information which allows receivers on earth, such as a GPS receiver contained within the MS 40, to measure the time of arrival of the received signals relative to an arbitrary point in time. This relative time-of-arrival measurement may then be converted to a pseudorange.

The pseudorange measurements to a sufficient number of GPS satellites 45 and the locations of these satellites are typically provided to an algorithm. Based on this information, the algorithm computes the position of the MS. The position of a GPS receiver, and thus the position of the MS 40, may be accurately estimated (to within 10 to 100 meters for many GPS receivers) assuming that a sufficient number of pseudorange measurements can be attained. The computations to determine the position of the MS may be performed by the MS, the PDE, the BS, or some other entity.

For a terrestrial-based solution, no measurements from the GPS satellites 45 are used and the position of the MS may be determined solely on measurements obtained from BSs 35 present in the CDMA communication system. A number of different position determination techniques may be used including, for example, MS-assisted, MS-based, and network-assisted positioning methods. Specific examples of suitable methods that may be implemented include timing advance (TA), time of arrival (TOA), angle of arrival (AOA), observed time difference (OTD), time difference of arrival (TDOA), advanced forward link trilateration (AFLT) (sometimes referred to as enhanced observed time difference (EOTD)), observed time difference of arrival (OTDOA), geographical proximity detection (for example, RFID), cell sector, mixed cell sector, ranging via signal strength, combinations of these and other such methods.

For a hybrid solution based on measurements from both GPS and the CDMA communication system, one or more measurements from one or more BSs 35 may be used in place of measurements obtained from the GPS satellites 45. In a hybrid scheme, each BS 35 and each GPS satellite 45 represents a transmission node. To determine the position of the remote terminal, such as the MS 40, transmissions from three or more non-spatially aligned nodes (BSs and/or GPS satellites) are processed. A fourth node may be used to provide altitude and may also provide increased accuracy. The signal arrival times can be determined for the transmission nodes and used to compute pseudoranges, which can then be used (for example, via a trilateration technique) to determine the position of the MS. The hybrid solution typically provides the highest attainable accuracy for cases in which an insufficient number of GPS satellites are available to compute the GPS-based solution.

The functionality of the MSC 20, PDE 25, BSC 30, and BS 35 are shown in FIG. 1 as distributed. However it is to be understood that the functionality of one or more of these components could likewise be centralized into a single module. Furthermore, the connectivity of these components may differ from that shown in FIG. 1. For example, the PDE may be connected to and serve more than one MSC 20 or BSC 30.

Figure 2:
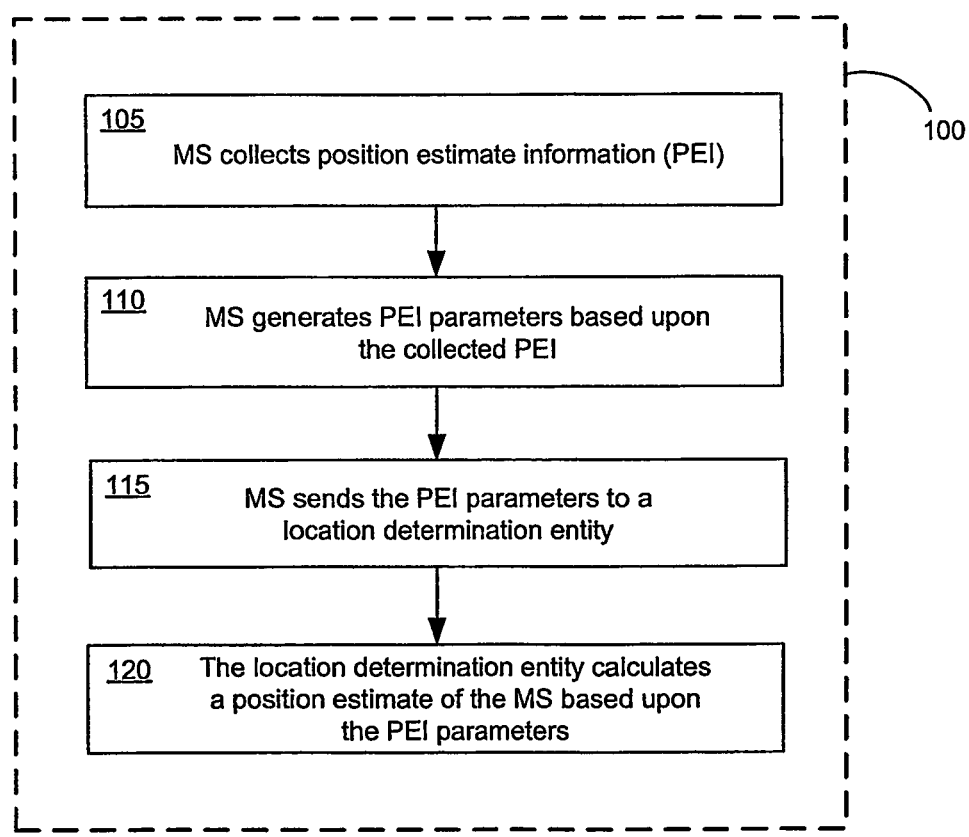
FIG. 2 shows a process for calculating a position estimate.

FIG. 2 shows a process 100 for calculating a position estimate. At block 105, the MS collects position estimate information (PEI) transmitted by a location node such as the BS 35. As previously described, the BS may transmit the PEI using a periodic or continuous broadcast signal, or as a point-to-point communication (for example, MS-initiated or BS-initiated). The collected PEI includes information which can be used to locate or identify the transmitting BS. An example of some of the various types of information which may be included in the PEI is depicted in Table 1. Using a CDMA network as an example, the PEI may be transmitted using the IS-801 messaging standard. In some embodiments, the MS collects PEI from a plurality of transmitting BSs.

At block 110, the MS 40 generates PEI parameters based upon the collected PEI. Note that the PEI is typically collected and stored at the MS prior to calculating the PEI parameters. If desired, the MS can collect and store a number of PEIs collected from one or more BSs. The MS may initiate the generation of the PEI parameters in response to a number of different triggers. Such triggers include, for example, the passage of some predetermined or other period of time, the MS determines that the accuracy of its position determination is beyond some threshold, responsive to an application executing at the MS, a manual request by the user of the MS, or a request communicated by another network entity (for example, PDE 25).

A specific trigger is one in which a position determination entity, such as the PDE 25, transmits a location request message to the MS. In other embodiments, the MS may generate a request for a pilot phase measurement, or a request for GPS pseudoranges. The request for such information may also be used to trigger the generation of the PEI parameters in accordance with block 110.

Regardless of how the operation of block 110 is triggered, the MS will assemble, calculate, or otherwise generate the PEI parameters for communicating to a position determination entity, such as the PDE 25. As described above, the PEI parameters include any information that permits the calculation of a position estimate, and no particular type or amount of information is required. Again, the PEI parameters may include some or all of the PEI received from one or more transmitting BSs 35, or information known or ascertainable by the MS 40, or combinations thereof. Tables 1 and 2 depict specific types of information which may be included in a message containing the generated PEI parameters.

Once generated, the MS sends the PEI parameters to a position determination entity (block 115). In a CDMA network, the position determination entity may be the PDE 25. After receiving the PEI parameters, the position determination entity calculates the position estimate utilizing the information contained in the PEI parameters (block 120). The position determination entity may calculate the position estimate using known techniques, the specifics of which are not essential here. The accuracy of the position estimate will typically depend upon factors such as the type, amount, and accuracy of the PEI and PEI parameters.

The position estimate is information that is quite useful and therefore desired by a number of different network entities and applications. It is to be understood that the calculated position estimate is useful even if the estimate can only locate the MS with a very coarse degree of accuracy (for example, 100-1,000 kilometers). In some embodiments, the position estimate may be used as the basis for more accurate position determination calculations. The PDE, the MS, or some other entity may perform such calculations.

Figure 3:
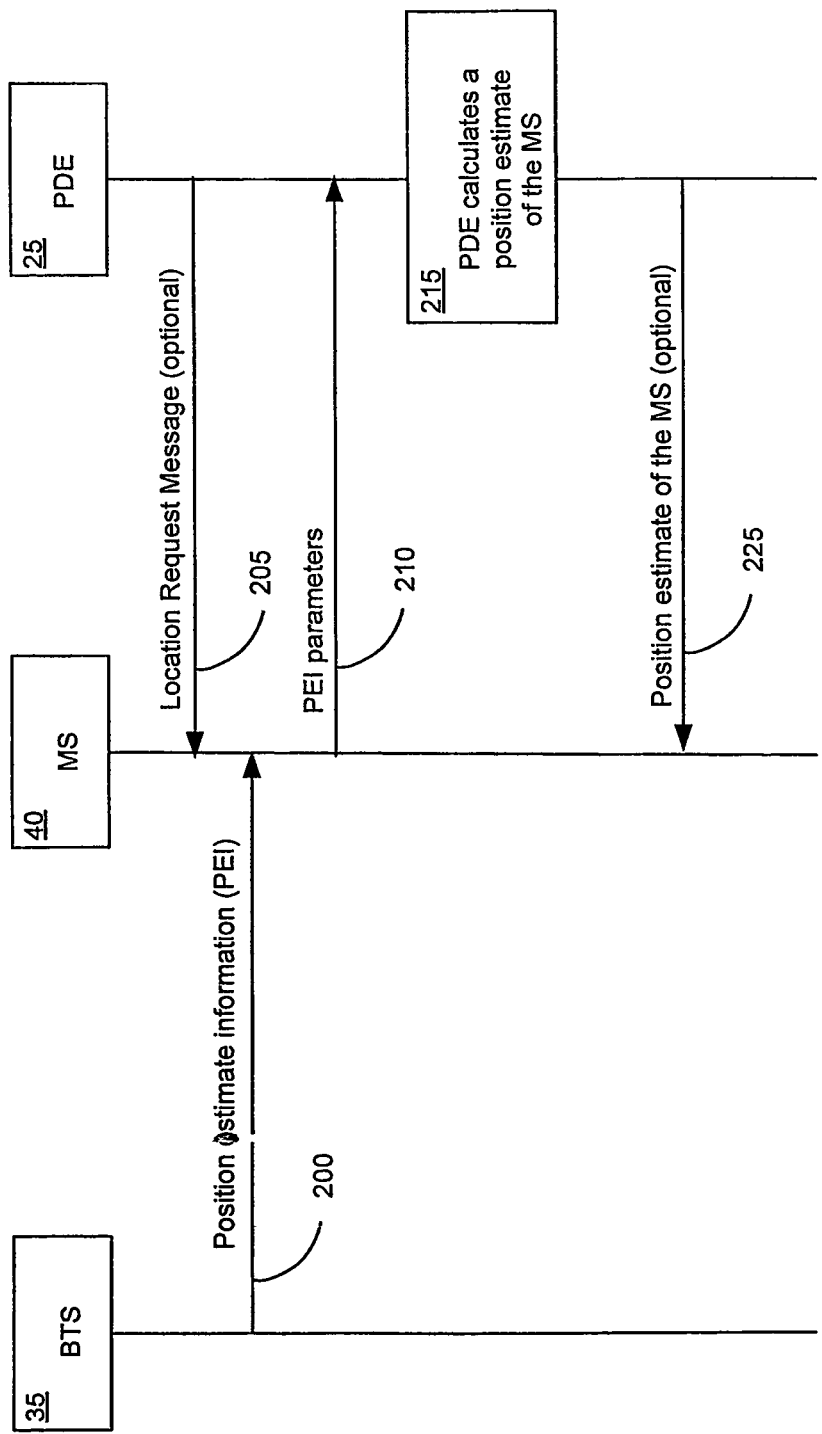
FIG. 3 is a block diagram showing a messaging flow between several network entities of the hybrid position determination system shown in FIG. 1.

FIG. 3 is a block diagram showing messaging flow between several network entities of the hybrid position determination system 10. At operation 200, the BS 35 transmits PEI to the MS 40. In operation 205, which is optional, the PDE 25 communicates a location request message to the MS for PEI parameters. Such a request may be initiated, for example, whenever the PDE or some other network entity desires knowledge of the position estimate. At some point, the MS calculates the PEI parameters using, for example, any of the techniques previously described. Note that the PEI parameters may be generated in response to the request sent by the PDE (operation 205), or the PEI parameters may be generated responsive to a particular trigger generated by the MS, as described with respect to FIG. 2. In operation 210, the MS sends the PEI parameters to the PDE 25. Next, in operation 215, the PDE calculates a position estimate. If desired, the calculated position estimate may then be sent to other network entities, such as the MS 40 (operation 225).

Figure 4:
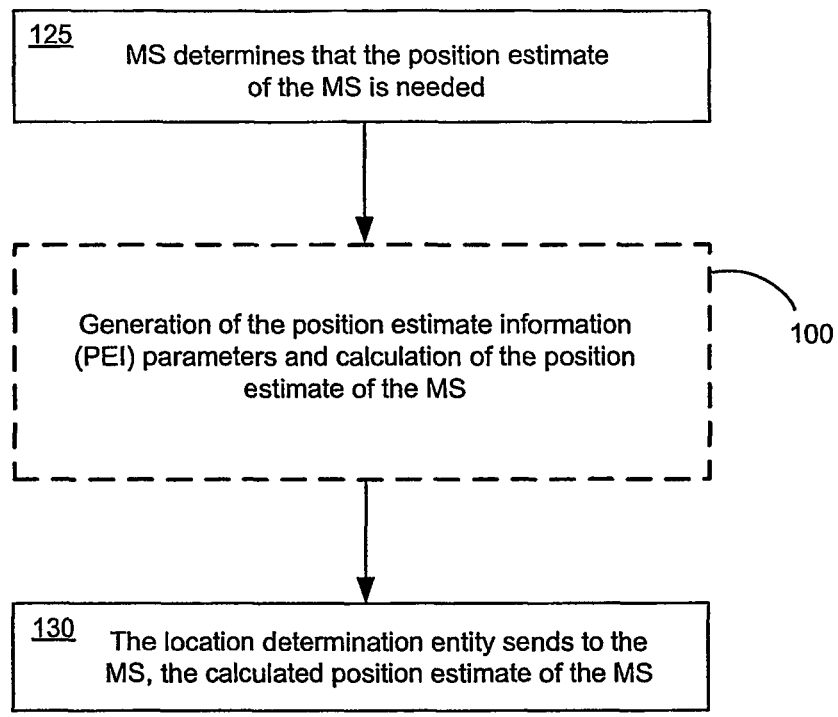
FIG. 4 shows a process for calculating a position estimate.

FIG. 4 shows a process for calculating a position estimate. At block 125, the MS determines that the position estimate is needed. This operation may be accomplished using any of the MS-based or PDE-based triggers previously described. At block 100 (from FIG. 2), the position estimate is determined using, for example, the process depicted in FIG. 2. Next, at block 130, the position determination entity (for example, the PDE 25), sends the calculated position estimate.

Although embodiments of the present invention may be implemented using the series of operations depicted in FIGS. 2-4, those of ordinary skill in the art will realize that additional or fewer operations may be performed. Moreover, it is to be understood that the order of operations shown in these figures is merely one example and that no single order of operations is required.

Figure 5:
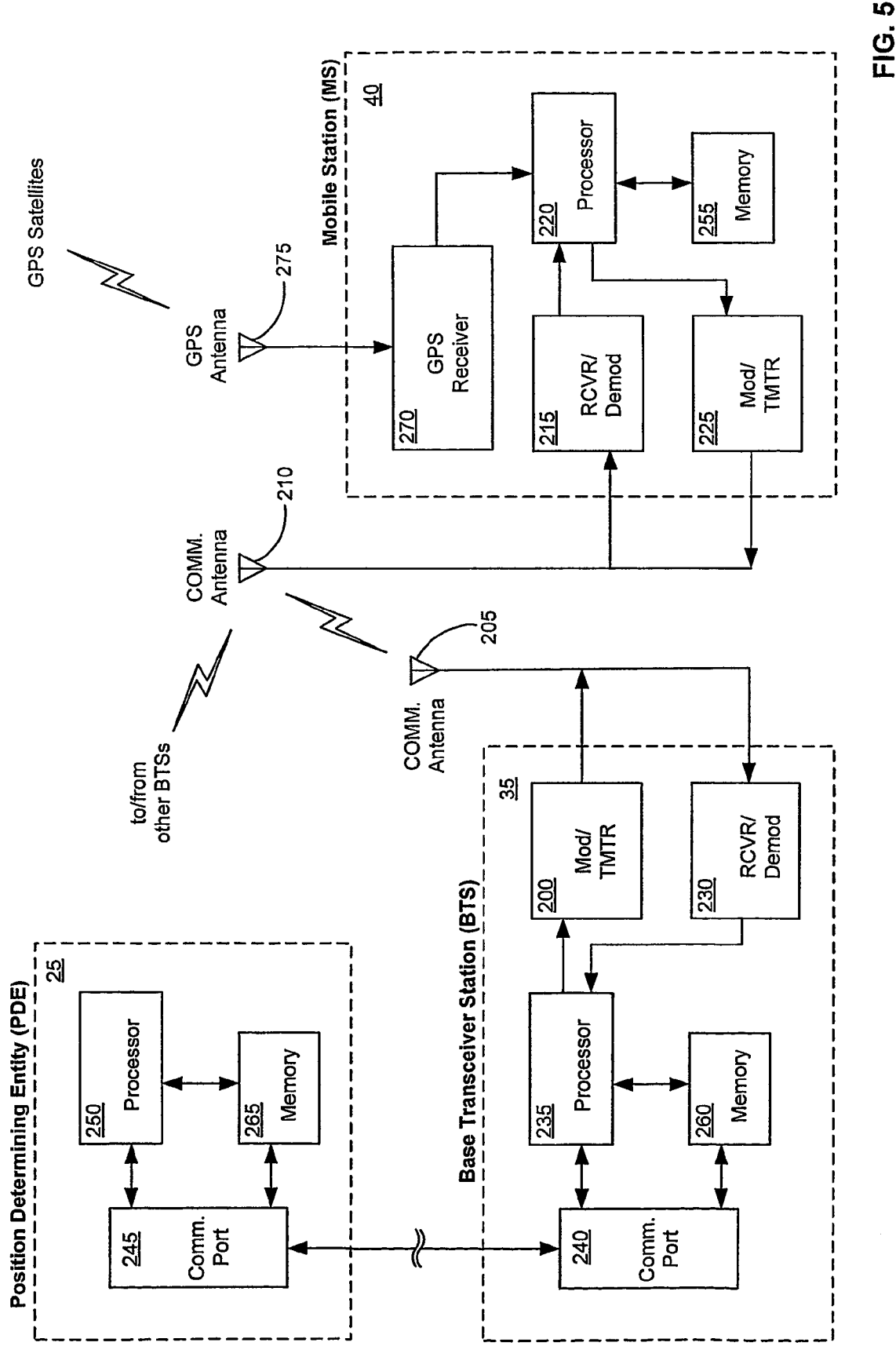
FIG. 5 is a simplified block diagram of various entities that may be implemented in the hybrid position determination system shown in FIG. 1.

FIG. 5 is a simplified block diagram of various entities that may be implemented in the system 10. The MS 40 is in wireless communication with BS 35, which is shown operatively coupled to the PDE 25. For simplicity, the BSC 30, MSC 20, and public network 15 have been omitted from this figure.

On the forward link, data, pilot, and signaling to be transmitted by BS 35 is processed (for example, coded, modulated, filtered, amplified, quadrature modulated, and upconverted) by a modulator/transmitter (Mod/TMTR) 200 to provide a forward link modulated signal. This signal is then transmitted via an antenna 205 to mobile stations within the coverage area of the BS. A specific example of such a communication is the transmission of the PEI.

The MS 40 receives the forward link modulated signals from one or more location nodes, such as BSs 35. This signal is received at antenna 210 and is routed to a receiver/demodulator (RCVR/Demod) 215. The RCVR/Demod 215 then processes the received signal in a complementary manner to provide various types of information that may be used for, among other things, the calculation of the PEI parameters. Specifically, the RCVR/Demod 215 provides the PEI to the processor 220, which subsequently calculates the PEI parameters. The RCVR/Demod 215 may implement a rake receiver that is capable of concurrently processing multiple signal instances (or multipath components) in the received signal for a number of received BSs. A typical rake receiver includes a number of finger processors (or fingers), each of which may be assigned to process and track a particular multipath component.

On the reverse link, data, pilot, and/or signaling to be transmitted by the MS 40 are processed by the modulator/transmitter (Mod/TMTR) 225 to provide a reverse link modulated signal. The PEI parameters are specific examples of information that may be transmitted in the reverse link modulation signal. The reverse link modulated signal is then transmitted via antenna 210 to the BS 35. The BS receives the reverse link modulated signal from the MS 40 at antenna 205. The received signal is then routed to a receiver/demodulator (RCVR/Demod) 230 that processes the received signal in a complementary manner to provide various types of information to the processor 235.

In the embodiment shown in FIG. 5, a communication port 240 within the BS 35 operatively couples to a communication port 245 of the PDE 25. Communication ports 240 and 245 allow BS 35 and PDE 25 to exchange pertinent information relating to position estimation, among other types of data. For example, these ports may be used to support the BS 35 communication of the PEI parameters to the PDE. The PDE includes a processor 250 which calculates the position estimate using the PEI parameters generated by the MS. In some instances, the PDE may communicate the calculated position estimate to the BS, which in turn communicates this information to the MS.

As previously noted, some embodiments utilize the position estimate as part of a refined, and typically more accurate, position determination calculation for the MS. In this embodiment, the refined position fix for the MS 40 may be computed at the MS 40, BS 35, PDE 25, or some other network entity. The entity performing the refined position determination is provided with the pertinent information needed to derive the refined position fix. Such information may include, for example, the previously calculated position estimate, the identities (for example, BASE_ID) of the measured BSs to be used to determine the combined expected area, the expected area (for example, the center, size, and shape) for each measured BS, the received signal strength or received power for each measured BS, and the like.

The refined position fix for the MS 40 may be performed by processor 220 within the MS 40, processor 235 within BS 35, or processor 250 within PDE 25. Memory units 255, 260, and 265 may be used to store various types of information needed for estimating the position of the MS, such as, for example, the PEI, and PEI parameters. Memory units 255, 260, and 265 may also store program codes and data for processors 220, 235, and 250, respectively.

The MS 40 is shown optionally configured with GPS receiver 270. GPS signals transmitted by GPS satellites 45 are received through GPS antenna 275 and input to the GPS receiver that acquires the pseudorandom noise (PN) codes for the various received satellites. The data produced by the GPS receiver is processed by processor 220 for transmittal by Mod/TMTR 225. The MS 40 is shown with separate communication and GPS antennae 210 and 275. However, the functionality of these two antennae may be combined into a single antenna if so desired.

The method and apparatus described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures, functions, and the like, each of which perform one or more of the functions and operations described herein. The software codes can be implemented with a software application written in any suitable programming language and may be stored in a memory unit (for example, memory units 255, 260, and 265), and executed by a processor (for example, processors 220, 235, and 250). The memory units may be implemented within the processor or external to the processor, in which case it can be communicatively coupled to the processor using known communication techniques. The memory units shown in FIG. 5 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, or other similar memory or data storage device.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed only with reference to the claims.

The invention claimed is:

1. A method for calculating an estimate of a position of a mobile station, comprising:

collecting in a mobile station, position estimate information (PEI) transmitted by a plurality of location nodes in one or more PEI messages carried on at least one of a common channel or a dedicated channel, wherein the PEI in the one or more PEI messages includes a location node identification and longitude and latitude information of the location node of the plurality of location nodes;

generating in the mobile station, PEI parameters based upon the PEI, wherein the PEI parameters include the longitude and latitude information of the location node of the plurality of location nodes from which the location node of the plurality of location nodes can be uniquely located or identified; and sending the PEI parameters from the mobile station to a position determination entity, wherein the PEI parameters permit calculation of a position estimate for the mobile station.

2. The method according to claim 1, further comprising:
receiving in the mobile station, a location request message from the position determination entity; and
initiating the generating of the position estimate information (PEI) parameters responsive to the location request message.

3. The method according to claim 1, further comprising:
initiating the generating of the position estimate information (PEI) parameters responsive to a location request generated by the mobile station.

4. The method according to claim 1, wherein the position estimate information (PEI) parameters include the time when the mobile station receives the PEI.

5. The method according to claim 1, wherein the position estimate information (PEI) parameters indicate whether or not the mobile station is currently in view of the location node.

6. The method according to claim 1, wherein if the mobile station is not currently in view of the location node, the position estimate information (PEI) parameters include information relating to elapsed time which the mobile station has been out of view of the location node.

7. The method according to claim 1, wherein if the mobile station is not currently in view of the location node, the position estimate information (PEI) parameters include velocity estimation of the mobile station.

8. The method according to claim 1, wherein if the mobile station is currently in view of the location node, the position estimate information (PEI) parameters include information relating to proximity of the mobile station relative to the location node.

9. The method according to claim 8, wherein the information relating to the proximity of the mobile station relative to the location node comprises signal strength of the location node.

10. The method according to claim 8, wherein the information relating to the proximity of the mobile station relative to the location node comprises a signal-to-interference ratio of the location node.

11. The method according to claim 8, wherein the information relating to the proximity of the mobile station relative to the location node comprises a round-trip-delay (RTD) measurement.

12. The method according to claim 1, wherein the position estimate information (PEI) parameters include a direction of motion of the mobile station.

13. The method according to claim 1, wherein the position estimate information (PEI) parameters include the channel identification at which the mobile station and the location node communicate.

14. The method according to claim 1, wherein the position estimate information (PEI) parameters include information which identifies a device type of the mobile station.

15. The method according to claim 1, wherein the position estimate information (PEI) parameters include information which identifies a transmitter type of the location node.

16. The method according to claim 1, wherein the position determination entity comprises a position determination entity (PDE) operating in a code division multiple access (CDMA) network.

17. The method according to claim 1, wherein the position determination entity comprises a service mobile location center (SMLC) operating in a global system for mobile communications (GSM) network.

18. The method according to claim 1, wherein the location node comprises a base station.

19. The method according to claim 1, wherein the location node comprises a wireless access point.

20. The method according to claim 1, wherein each of the plurality of location nodes comprises a different type of transmission entity.

21. The method according to claim 1, wherein the position estimate information (PEI) comprises a system parameters message (SPM).

22. The method according to claim 1, wherein the position estimate information (PEI) comprises a standard code division multiple access (CDMA) system parameters message (SPM).

23. The method according to claim 1, wherein the position estimate information (PEI) is a broadcast message from the location node.

24. A method for calculating a position estimate of a mobile station which has generated position estimate information (PEI) parameters based upon PEI transmitted by a location node, the method comprising:
receiving in a position determination entity, PEI parameters sent by a mobile station, the PEI parameters including information from which a location node can be located or identified including longitude and latitude information of the location node and wherein the PEI parameters contain some or all of PEI transmitted by the location node in one or more PEI messages, and additional information identified by the mobile station based on longitude and latitude information included in the PEI; and
calculating the position estimate of the mobile station based upon the PEI parameters.

25. The method according to claim 24, further comprising:
sending a location request message to the mobile station, causing the mobile station to send the position estimate information (PEI) parameters.

26. The method according to claim 24, further comprising:
sending the position estimate to the mobile station.

27. The method according to claim 24, wherein the position estimate information (PEI) parameters indicate whether or not the mobile station is currently in view of the location node.

28. The method according to claim 24, wherein the position estimate information (PEI) parameters include a pseudo-random noise (PN) code index of the location node.

29. The method according to claim 24, wherein if the mobile station is not currently in view of the location node, the position estimate information (PEI) parameters include information relating to elapsed time which the mobile station has been out of view of the location node.

30. The method according to claim 24, wherein if the mobile station is not currently in view of the location node, the position estimate information (PEI) parameters include velocity estimation of the mobile station.

31. The method according to claim 24, wherein if the mobile station is currently in view of the location node, the position estimate information (PEI) parameters include information relating to proximity of the mobile station relative to the location node.

32. The method according to claim 31, wherein the information relating to the proximity of the mobile station relative to the location node comprises signal strength of the location node.

33. The method according to claim 31, wherein the information relating to the proximity of the mobile station relative to the location node comprises a signal-to-interference ratio of the location node.

34. The method according to claim 31, wherein the information relating to the proximity of the mobile station relative to the location node comprises a round-trip-delay (RTD) measurement.

35. The method according to claim 24, wherein the position determination entity comprises a position determination entity (PDE) operating in a code division multiple access (CDMA) network.

36. The method according to claim 24, wherein the position determination entity comprises a service mobile location center (SMLC) operating in a global system for mobile communications (GSM) network.

37. The method according to claim 24, wherein the position estimate information (PEI) parameters include information which identifies a location of at least one of a plurality of location nodes with which the mobile station is in communication.

38. A system for calculating a position estimate of a mobile station, the system comprising:
  a location node of a plurality of location nodes configured for transmitting position estimate information (PEI) to the mobile station in one or more PEI messages carried on at least one of a common channel or a dedicated channel, wherein the PEI in the one or more PEI messages includes a location node identification and longitude and latitude information of the location node of the plurality of location nodes;
  a position determination entity for receiving PEI parameters sent by the mobile station, the mobile station having generated the PEI parameters based upon the PEI, and wherein the PEI parameters include the longitude and latitude information of the location node of the plurality of location nodes from which the location node of the plurality of location nodes can be located or identified; and
  a processor associated with the position determination entity, the processor calculating the position estimate of the mobile station based upon the PEI parameters.

39. The system according to claim 38, wherein the position determination entity sends a location request message to the mobile station, causing the mobile station to generate the position estimate information (PEI) parameters.

40. The system according to claim 38, wherein the position estimate information (PEI) parameters indicate whether or not the mobile station is currently in view of the location node.

41. The system according to claim 38, wherein if the mobile station is not currently in view of the location node, the position estimate information (PEI) parameters include information relating to elapsed time which the mobile station has been out of view of the location node.

42. The system according to claim 38, wherein if the mobile station is not currently in view of the location node, the position estimate information (PEI) parameters include velocity estimation of the mobile station.

43. The system according to claim 38, wherein if the mobile station is currently in view of the location node, the position estimate information (PEI) parameters include information relating to proximity of the mobile station relative to the location node.

44. The system according to claim 43, wherein the information relating to the proximity of the mobile station relative to the location node comprises signal strength of the location node.

45. The system according to claim 43, wherein the information relating to the proximity of the mobile station relative to the location node comprises a signal-to-interference ratio of the location node.

46. The system according to claim 43, wherein the information relating to the proximity of the mobile station relative to the location node comprises a round-trip-delay (RTD) measurement.

47. The system according to claim 38, wherein the position determination entity comprises a position determination entity (PDE) operating in a code division multiple access (CDMA) network.

48. The system according to claim 38, wherein the position determination entity comprises a service mobile location center (SMLC) operating in a global system for mobile communications (GSM) network.

49. The system according to claim 38, wherein each of the plurality of location nodes comprise a different type of transmission entity.

50. The system according to claim 38, wherein the position estimate information (PEI) comprises a system parameters message (SPM).

51. The system according to claim 38, wherein the position estimate information (PEI) comprises a standard code division multiple access (CDMA) system parameters message (SPM).

52. The system according to claim 38, wherein the position estimate information (PEI) is a broadcast message from the location node.

53. The system according to claim 38, wherein the location node comprises a base station.

54. The system according to claim 38, wherein the location node comprises a wireless access point.

55. A non-transitory computer readable medium containing instructions for controlling a computer which calculates a position estimate of a mobile station according to a method comprising:
  collecting in a mobile station, position estimate information (PEI) transmitted by a plurality of location nodes in one or more PEI messages carried on at least one of a common channel or a dedicated channel, wherein the PEI in the one or more PEI messages includes a location node identification and longitude and latitude information of the location node of the plurality of location nodes;
  generating in the mobile station, PEI parameters based upon the PEI, wherein the PEI parameters include the longitude and latitude information of the location node of the plurality of location nodes from which the location node of the plurality of location nodes can be uniquely located or identified; and sending the PEI parameters from the mobile station to a position determination entity, wherein the PEI parameters permit calculation of a position estimate for the mobile station.

56. A system for calculating a position estimate of a mobile station, the system comprising:

transmitting means for transmitting position estimate information (PEI) to the mobile station in one or more PEI messages carried on one of a common channel or a dedicated channel, and wherein the PEI in the one or more PEI messages includes a location node identification and longitude and latitude information of the location node;

locating means for receiving PEI parameters sent by the mobile station, the mobile station having generated the PEI parameters based upon the PEI, and wherein the PEI parameters include information from which the location node can be located or identified including longitude and latitude information of the location node and wherein the PEI parameters contain some or all of the PEI received from the location node and additional information which can be identified by the mobile station; and processing means associated with the locating means, the processing means calculating the position estimate of the mobile station based upon the PEI parameters.

57. A mobile station for use in a communications network, the mobile station comprising:

an antenna configured to receive position estimate information (PEI) messages comprising PEI from a location node of a plurality of location nodes of the communications network on at least one of a common channel or a dedicated channel; and a processor communicatively coupled with the antenna and configured to process the PEI received from the location node via the antenna to:

determine a location node identification and longitude and latitude information of the location node contained in the PEI;

generate PEI parameters based upon the PEI including the longitude and latitude information such that the location node can be uniquely located or identified from the PEI parameters, and the position estimate can be calculated from the PEI parameters; and send the PEI parameters from the mobile station via the antenna toward a position determining entity.

58. A method for calculating an estimate of a position of a mobile station, comprising:

collecting in a mobile station, a first position estimate information (PEI) transmitted by a first location node;

collecting in the mobile station, a second PEI transmitted by a second location node, wherein the second location node and the first location node belong to different systems;

generating in the mobile station, PEI parameters based upon the first PEI and the second PEI, wherein the PEI parameters include information from which the first location node and the second location node can be uniquely located and identified, wherein the PEI parameters for one of the location nodes includes longitude and latitude parameters for that location node; and sending the PEI parameters from the mobile station to a position determination entity, wherein the PEI parameters permit calculation of a position estimate for the mobile station by the position determination entity.

59. The method of claim 58, wherein the first location node is a satellite of a satellite navigation system, and the second node is a base station of a cellular network.

60. The method of claim 59, wherein the PEI parameters associated with the base station include the longitude and latitude information of the base station.

* * * * *